A. T. Morris,
Dredger.
No. 85,602. Patented Jan. 5. 1869.

A. T. Morris,

Dredger.

No. 85,602.  Patented Jan. 5, 1869.

UNITED STATES PATENT OFFICE.

AUGUSTUS T. MORRIS, OF BLOOMFIELD, NEW JERSEY, ASSIGNOR TO HIMSELF AND JAMES CUMMINGS, OF NEW YORK CITY.

IMPROVED GRAPPLE AND EXCAVATOR.

Specification forming part of Letters Patent No. 85,602, dated January 5, 1869.

*To all whom it may concern:*

Be it known that I, AUGUSTUS T. MORRIS, of Bloomfield, in the county of Essex and State of New Jersey, have invented, made, and applied to use a certain new and useful Improvement in Grapples or Excavators; and I do hereby declare the following to be a full, clear, and exact description of the said invention, reference being had to the annexed drawing, making part of this specification, wherein—

Figure 1:
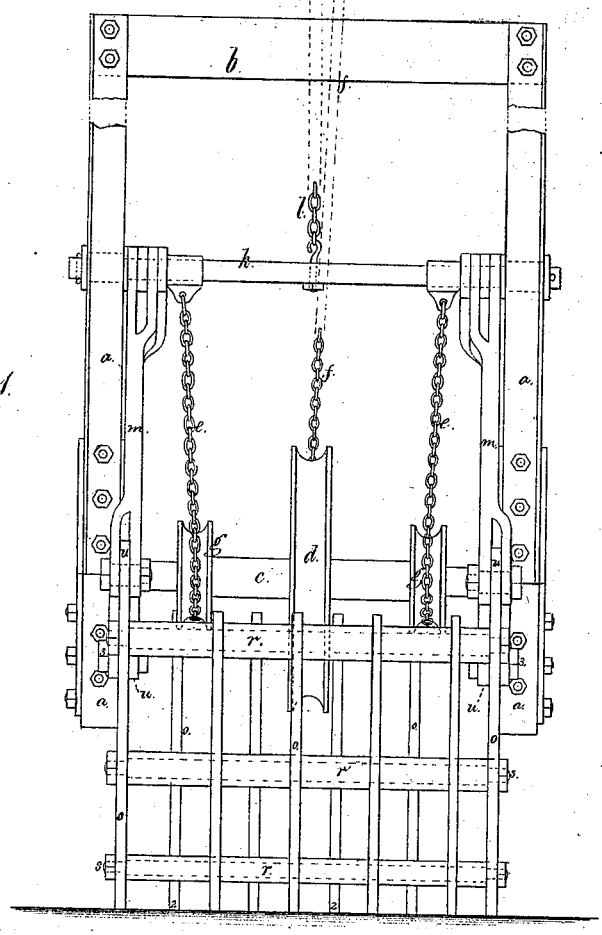
Figure 2:
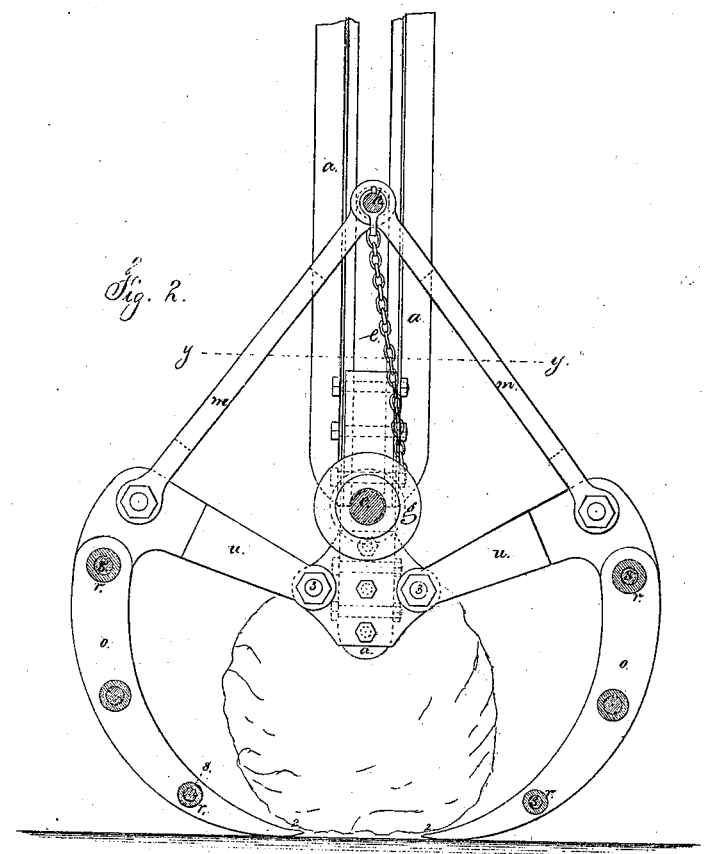
Figure 3:
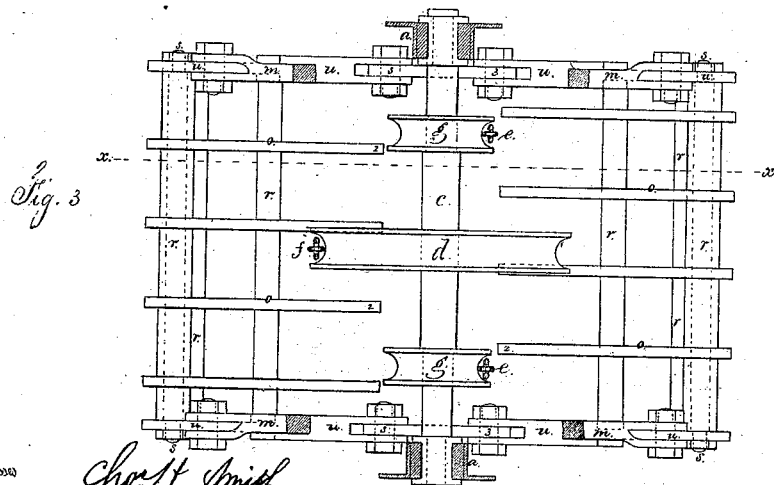

Figure 1 is an elevation of the said grapple. Fig. 2 is a vertical section of the same, partially open, at the line $x\,x$; and Fig. 3 is a sectional plan at the line $y\,y$, Fig. 2.

Similar marks of reference denote the same parts.

My invention is intended for grappling and lifting bowlders and rocks lying under water, for pulling up piles and crib-work, for tearing to pieces sunken vessels, and removing obstructions to navigable waters. This apparatus may also be employed for grappling and raising articles on land or shipboard, and then dropping said articles or becoming disconnected from them with facility.

In Letters Patent granted to me May 8, 1866, an apparatus is shown for excavating earth, mud, or other light or loose materials in a scoop formed of segmental buckets.

In my present invention, a pair of open-work claws, of a peculiar construction, is applied in place of the segmental buckets, and actuated by mechanism corresponding generally to that shown therein, so that the claws can be opened as required or closed by a very powerful mechanism, so as to grapple and firmly hold any article the machine is capable of grasping, or pull to pieces and cut up any vessel, piles, or other submarine obstructions of wood, by a series of blows in closing the grapple, or by pulling thereon by competent power.

In the drawing, $a\,a$ are side pieces, forming metal slides of suitable length, united at their upper ends by a head-block, $b$, and, if desired, guide-poles may be added to the frame thus formed; but under most circumstances the same will be disadvantageous.

$c$ is a shaft across the lower ends of the side pieces $a$, and supported in suitable bearings in said side pieces. Upon this shaft $c$ is a drum, $d$, for the hoisting-chain $f$, and also smaller drums $g\,g$ with chains $e\,e$ to the sliding cross-bar $h$, that is fitted at the ends in guides formed by the side pieces $a\,a$, so that said bar $h$ can be moved up or down bodily as operated upon by the chains $e\,e$ or the discharging-chain $l$, that is also attached to this bar $h$. From the bar $h$ the double-jointed toggle-bars $m$ extend to the angles of the grapple.

The grapple is made of a series of tapering and curved bars, $o$, terminating, if desired, with steel cutting-points 2 2. These bars are connected together and formed into a very strong grapple or claw by means of bolts $s$ passing through the bars and cylindrical thimbles $r$ around said bolts $s$ and between the said bars $o$.

The bars, at the angles of the respective claws, extend up and turn off nearly on the line of the radius of the curved bars $o$, and these form arms $u$, that are hinged, at 3 3, to the lower portions of the frame $a$ by means of very strong joints, so that these claws can be swung open or closed together by the toggle-bars $m$, that are jointed to the angle between the arms $u$ and the outer curved bars, $o$.

It will now be understood that by the chain $l$ the bar $h$ will be drawn up and the grapple held open while being lowered over any article to be moved, and that when the chain $f$ is drawn upon it operates, through the drums $d$ and $g$, chains $e$, bar $h$, and toggles $m$, to close the grapple with a powerful concussion or gripe.

When this apparatus is applied to stones or other hard substances, the claws grasp around the same; or by a series of blows, by pulling on first one chain and then the other, the points of the claws may be made to penetrate sufficiently to gripe the same for moving it.

With wood and other soft substances the chisel ends of the bars $o$ will penetrate; hence a firm hold can be obtained for tearing to pieces or pulling up articles that may be grasped; or the piles or timbers of crib-work, &c., may be cut off by a series of blows, producing a cutting or chopping action by the chisel ends of the grapple-bars $o$.

I do not claim the scoop or excavator in the patent of Ephraim Morris, granted December 12, 1848, my invention only relating to improvements thereon.

What I claim, and desire to secure by Letters Patent, is—

The grapple, formed of the bars $o$, united together and provided with the arms $u$, that are jointed at 3 to the frames $a$, in combination with the toggle-bars $m$, bar $h$, pulleys $d$ and $g\ g$, and actuating-chains $l\ f\ e$, substantially as set forth.

In witness whereof I have hereunto set my signature this 12th day of October, A. D. 1868.

A. T. MORRIS.

Witnesses:
CHAS. H. SMITH.
GEO. T. PINCKNEY.